United States Patent
Hága et al.

(10) Patent No.: US 12,177,747 B2
(45) Date of Patent: Dec. 24, 2024

(54) TECHNIQUE FOR ASSESSING POSITIONING QUALITIES

(71) Applicant: Telefonaktiebolaget LM Ericsson (publ), Stockholm (SE)

(72) Inventors: Péter Hága, Budapest (HU); Zsófia Kallus, Budapest (HU); Tamas Borsos, Budapest (HU); Peter Vaderna, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 17/631,050

(22) PCT Filed: Jul. 30, 2019

(86) PCT No.: PCT/EP2019/070502
§ 371 (c)(1),
(2) Date: Jan. 28, 2022

(87) PCT Pub. No.: WO2021/018386
PCT Pub. Date: Feb. 4, 2021

(65) Prior Publication Data
US 2022/0272504 A1    Aug. 25, 2022

(51) Int. Cl.
*H04W 4/33*     (2018.01)
*G01S 5/02*     (2010.01)
(Continued)

(52) U.S. Cl.
CPC ............ *H04W 4/33* (2018.02); *G01S 5/0244* (2020.05); *G01S 5/14* (2013.01); *H04W 4/029* (2018.02)

(58) Field of Classification Search
CPC ..... H04W 64/00; H04W 64/006; H04W 4/00; H04W 4/02; H04W 4/029
See application file for complete search history.

(56) References Cited

U.S. PATENT DOCUMENTS

| | | |
|---|---|---|
| 2002/0094824 A1 | 7/2002 | Kennedy et al. |
| 2005/0182518 A1 | 8/2005 | Karlsson |
| | (Continued) | |

FOREIGN PATENT DOCUMENTS

| | | | | |
|---|---|---|---|---|
| WO | WO-2018191425 A1 | * | 10/2018 | ........... G01S 3/8003 |
| WO | 2018204019 A1 | | 11/2018 | |

OTHER PUBLICATIONS

Fan, Qigao, et al., "Data Fusion for Indoor Mobile Robot Positioning Based on Tightly Coupled INS/UWB", The Journal of Navigation, vol. 70, Issue 5, Cambridge Core, published online Apr. 17, 2017, Sep. 2017, 1-6.

*Primary Examiner* — Diana J. Cheng
(74) *Attorney, Agent, or Firm* — Murphy, Bilak & Homiller, PLLC

(57) ABSTRACT

A technique for assessing positioning qualities within a localization area of a positioning system comprising a plurality of anchor nodes for determining positions of tag devices within the localization area using radio technology is disclosed. A method implementation of the technique comprises determining (S202) a positioning deviation between an absolute position of a tag device and a relative position of the tag device, the absolute position of the tag device being determined by the positioning system using the plurality of anchor nodes and the relative position of the tag device being determined based on movement related measurements performed by the tag device relative to a previously determined absolute position of the tag device, and assessing (S204) a positioning quality for the absolute position based on the determined positioning deviation.

20 Claims, 4 Drawing Sheets

(51) Int. Cl.
    *G01S 5/14*     (2006.01)
    *H04W 4/029*    (2018.01)

(56)         References Cited

U.S. PATENT DOCUMENTS

2012/0283947 A1   11/2012   T'Siobbel
2017/0371023 A1   12/2017   Syrjärinne et al.
2018/0196118 A1    7/2018   Park et al.

* cited by examiner

TECHNIQUE FOR ASSESSING POSITIONING QUALITIES

TECHNICAL FIELD

The present disclosure generally relates to positioning systems. In particular, a technique for assessing positioning qualities within a localization area of a positioning system comprising a plurality of anchor nodes for determining positions of tag devices within the localization area using radio technology is presented. The technique may be embodied in methods, computer programs, apparatuses and systems.

BACKGROUND

Positioning systems, in particular indoor positioning systems, are nowadays used for various tasks in the industrial domain, e.g., for high value asset or product tracking, or to ensure safety by tracking vehicles and humans moving in close proximity to each other, for example. These positioning systems may be based on radio technologies, such as WiFi, Bluetooth, Ultra Wideband (UWB), Long Term Evolution (LTE) or 5G technologies, for example, and most of them typically require an infrastructure installation that comprises a plurality of anchor nodes with known positions whose coverage area defines a localization area within which the positions of movable tags devices may be determined. This may be done by measurements using the radio technology, such as using ranging measurements directly measuring the distance between the anchor nodes and tag devices (e.g., in UWB based systems), or using signal strength based measurements, e.g., considering the Radio Signal Strength Index (RSSI), between anchors and tags (e.g., in Bluetooth based systems).

For all of these systems, the usability may strongly be affected by the physical installation of the anchor infrastructure (e.g., with respect to layout, density and line-of-sight conditions), since both the direct range measurement based solutions and the signal strength based solutions are generally sensitive to radio shielding and reflections caused by the physical environment. In industrial situations, such as in factory halls, for example, metallic objects may significantly deteriorate the theoretical or optimal radio conditions that are needed to meet the criteria for accurate positioning. In these challenging environments, the planning of the anchor infrastructure aiming to ensure high quality radio coverage may be extremely difficult, even if the environment is stationary (e.g., when factory objects are not reorganized). In situations where the environment is reorganized regularly, a priori radio planning for high quality radio coverage may be virtually impossible. Especially for critical applications utilizing indoor positioning systems (e.g., for control of Autonomous Guided Vehicles (AGVs)), it may be vital to provide proper radio coverage in all areas where positioning of tag devices is necessary.

Existing solutions for collecting information regarding radio coverage are typically based on fingerprinting methods which may require lots of workhours and may infer with normal production processes, which usually makes them expensive. Due to the generally non-automated approaches of existing solutions, these techniques may induce systematic errors into the positioning precision, which fundamentally decreases the utility of the systems.

SUMMARY

Accordingly, there is a need for a technique which avoids one or more of the problems discussed above, or other problems.

According to a first aspect, a method for assessing positioning qualities within a localization area of a positioning system comprising a plurality of anchor nodes for determining positions of tag devices within the localization area using radio technology is provided. The method comprises determining a positioning deviation between an absolute position of a tag device and a relative position of the tag device, the absolute position of the tag device being determined by the positioning system using the plurality of anchor nodes and the relative position of the tag device being determined based on movement related measurements performed by the tag device relative to a previously determined absolute position of the tag device, and assessing a positioning quality for the absolute position based on the determined positioning deviation.

Assessing the positioning quality for the absolute position may include classifying the absolute position as valid or invalid depending on whether the absolute position is determined to match or mismatch the relative position, respectively. A match or mismatch between the absolute position and the relative position may be determined in consideration of positioning accuracy variances of the positioning system. Determining a match or mismatch between the absolute position and the relative position may include comparing the determined positioning deviation with a deviation derived from an error distribution sample representing an absolute position and an error distribution sample representing a relative position.

The method may further comprise updating a positioning coverage map area to reflect the assessed positioning quality for the absolute position, the positioning coverage map indicating positioning qualities within the localization area. The positioning coverage map may be updated continuously based on positioning quality assessments performed for absolute positions of the tag device within the localization area. The method may further comprise determining areas of low positioning quality from the positioning coverage map. Determining the areas of low positioning quality may be triggered upon classifying the absolute position as invalid. The areas of low positioning quality may be determined using a machine learning model.

Determining the areas of low positioning quality from the positioning coverage map may include determining, from the positioning coverage map, at least one border separating areas of low positioning quality from areas of high positioning quality. The method may further comprise changing an operation mode for performing absolute position measurements by tag devices at the at least one border. Changing the operation mode may include at least one of repeatedly performing absolute position measurements by the tag devices at the at least one border, increasing a frequency of performing absolute position measurements by the tag devices at the at least one border, changing a calculation method of performing absolute position measurements by the tag devices at the at least one border, and tuning radio properties of at least one of the tag devices at the at least one border and the plurality of anchor nodes.

When the tag device is in an area of low positioning quality, the method may further comprise informing the tag device that the tag device is in an area of low positioning quality. When the tag device is in an area of low positioning quality, the method may further comprise instructing the tag device to raise an alarm indicating that positioning quality is low. The method may further comprise providing navigation information to at least one tag device within the localization area assisting the at least one tag device to avoid moving through the areas of low positioning quality. The method may further comprise generating information for positioning coverage extension to eliminate areas of low positioning quality within the localization area. The information for positioning coverage extension may include information on placement of additional anchor nodes.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for assessing positioning qualities within a localization area of a positioning system comprising a plurality of anchor nodes for determining positions of tag devices within the localization area using radio technology is provided. The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
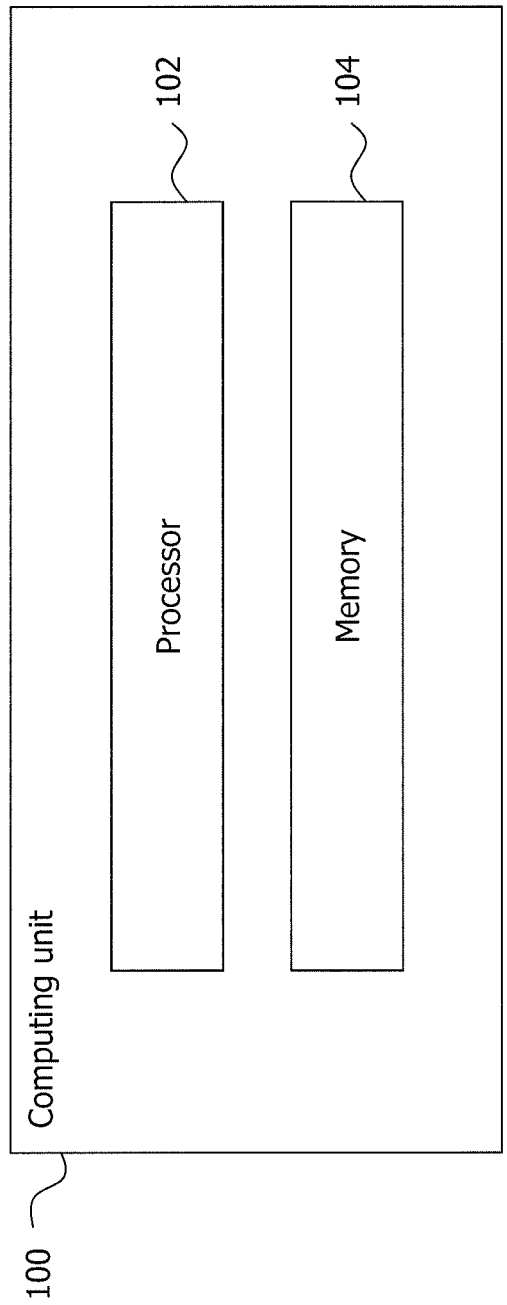
FIG. 1 illustrates an exemplary composition of a computing unit for assessing positioning qualities according to the present disclosure.

FIG. 1 schematically illustrates an exemplary composition of a computing unit 100 for assessing positioning qualities within a localization area of a positioning system comprising a plurality of anchor nodes for determining positions of tag devices within the localization area using radio technology. The computing unit 100 comprises at least one processor 102 and at least one memory 104, wherein the at least one memory 104 contains instructions executable by the at least one processor 102 such that the computing unit 100 is operable to carry out the method steps described herein below.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
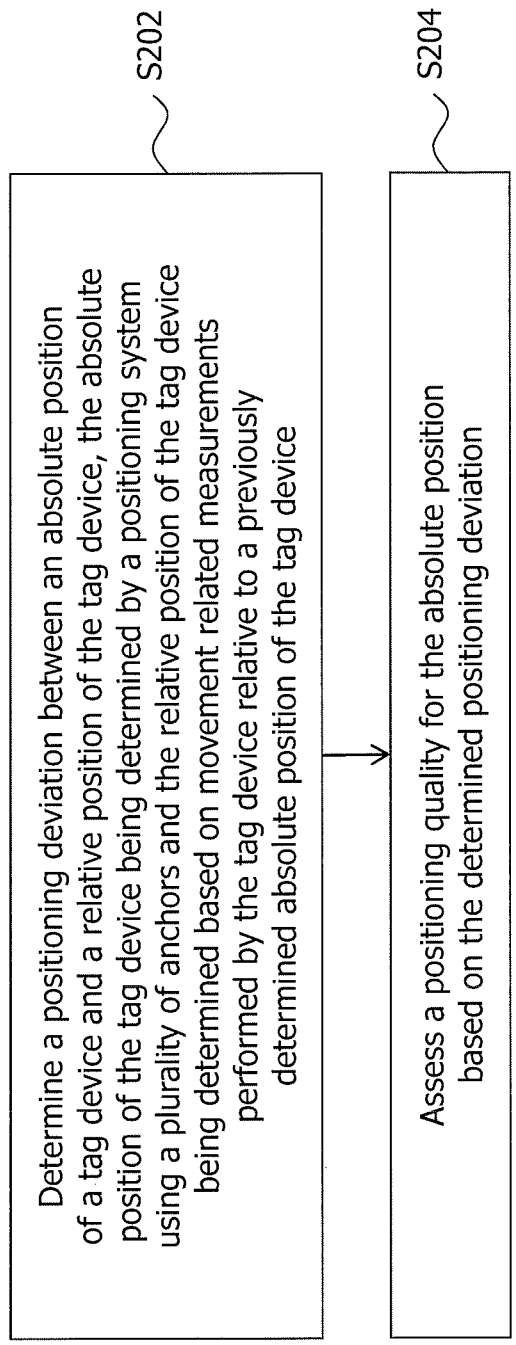
FIG. 2 illustrates a method which may be performed by the computing unit according to the present disclosure.

FIG. 2 illustrates a method which may be performed by the computing unit 100 according to the present disclosure. The method is dedicated to assessing positioning qualities within a localization area of a positioning system comprising a plurality of anchor nodes for determining positions of tag devices within the localization area using radio technology. In step S202, the computing unit 100 may determine a positioning deviation between an absolute position of a tag device and a relative position of the tag device, the absolute position of the tag device being determined by the positioning system using the plurality of anchor nodes and the relative position of the tag device being determined based on movement related measurements performed by the tag device relative to a previously determined absolute position of the tag device. In step S204, the computing unit 100 may assess a positioning quality for the absolute position based on the determined positioning deviation.

The relative position of the tag device may thus be used to validate (or "verify") the positioning quality by which the absolute position is determined, i.e., by comparing the relative position of the tag device with the absolute position of the tag device and assessing the positioning quality of the absolute position based on the determined positioning deviation between the absolute and the relative position. Unlike in traditional systems, from which it may be known to fuse absolute and relative measurements to generally improve positioning accuracy, according to the technique presented herein, the positioning deviation may rather be used as a measure of positioning quality. In other words, the two measurements may be considered independently for mutual validation instead of simply decreasing their uncertainty by fusion.

The absolute position of the tag device may be determined by the positioning system using the plurality of anchor nodes, e.g., the absolute position may be determined in accordance with known techniques involving measurements between anchor nodes (whose positions may be fixed and known, e.g., installed on ceilings or walls) and movable tag devices, such as involving ranging measurements or signal strength based measurements between the anchors and tags, as described above. Using ranging measurements, for example, the anchor nodes and tag devices may communicate using radio signals to perform two-way timing measurements of the time the signals travel between the anchors and tags to thereby measure the distance therebetween. The position of the tags can then be determined based on the ranging measurements, taking into consideration the known fixed coordinates of the anchor nodes. Known ranging measurement based techniques include Two Way Ranging (TWR) or Time of Flight (ToF) and Time Difference of Arrival (TDoA) based techniques, for example. One skilled in the art will appreciate that similar positioning can be implemented using techniques that consider the signal strength between the anchor nodes and the tag devices, such as the RSSI between anchors and tags, for example. The used radio technology may as such include at least one of WiFi, Bluetooth, UWB, LTE or 5G technologies, for example.

The relative position of the tag device may be determined based on movement related measurements performed by the tag device relative to a previously determined absolute position of the tag device. To this end, the tag device may comprise at least one movement related sensor for performing the movement related measurements of the tag device. The movement related measurements may be of various forms and may comprise any measurements that allow determining a movement of the tag device with respect to (or "relative to") a previous position of the tag device. For example, the at least one movement related sensor may comprise an accelerometer, a pedometer, an Inertial Measurement Unit (IMU), a gyroscope, a 6 Degree Of Freedom (6 DOF) or 9 DOF sensor, a pressure sensor for measuring altitude changes, a visual sensor (e.g., a camera), or any other sensor that is capable of detecting some motion metrics.

The relative position may be "relative" in the sense that it may be determined relative to a previously determined absolute position of the tag device, e.g., by integrating movement related data to an initial position which may be used as a reference position. The relative position may thus be calculated by integrating small steps of movements of the tag device reported by the at least one sensor from an absolute reference position of the tag device (e.g., the last successfully calculated absolute position of the tag device) as a start point of the integration, for example. The accuracy and the variance of the accuracy of relative positions may as such not mainly depend on the positioning capabilities (or "positioning coverage") of the positioning system used for determining the absolute positions, since the relative positions may generally be calculated based on the movement related sensor input data. "Positioning coverage" as referred to herein may mean the area in which positioning using the installed anchor nodes infrastructure is possible (corresponding to the localization area of the positioning system). The positioning coverage should not be mixed up with the pure radio coverage of the anchor nodes because, even if there may be some radio signal coverage at a particular location, it may not meet the requirements for the positioning calculations, for which multiple visible anchor signals may be needed. The accuracy of the relative positions may be considered to be high for a short period of time elapsed from the absolute reference position, but its positioning error may accumulate over time. The absolute reference position may as such be reset repeatedly (e.g., to the last successfully calculated absolute position of the tag device, such as the last absolute position of the tag device that has been determined to be "valid" or "true", for example) to avoid that the accumulated position error becomes too large over time.

The absolute position may correspond to a position in the localization area which is determined by the anchor node based positioning infrastructure, as described above, and the absolute position may as such be calculated independently from any previous position. The accuracy and the variance of the accuracy of absolute positions may thus depend on the actual measurement capabilities, i.e., the positioning coverage at the respective current position of the tag device in the localization area (i.e., at the location at which the measurements are currently collected). Due to the independence from previous calculations, inaccuracies may not accumulate over time or over a number of measurements, as it may be the case for relative positions, as described above.

As said, according to the technique presented herein, the relative position of the tag device may be used to validate the positioning quality by which the absolute position is determined, i.e., by comparing the relative position of the tag device with the absolute position of the tag device and assessing the positioning quality of the absolute position based on the determined positioning deviation between the absolute and the relative position. Based on this comparison, a classification algorithm may be used to determine whether the absolute position is valid (e.g., the relative position matches the absolute position) or invalid (e.g., the relative position does not match the absolute position). Assessing the positioning quality for the absolute position may thus include classifying the absolute position as valid or invalid depending on whether the absolute position is determined to match or mismatch the relative position, respectively. In other words, the absolute position may be classified as valid (or "true") if the absolute position is determined to match the relative position and the absolute position may be classified as invalid (or "false") if the absolute position is determined to mismatch the relative position.

It will be understood that, by "match" or "mismatch", not necessarily a precise (identical) match may be meant, but rather some fuzziness may be allowed. A match or mismatch between the absolute position and the relative position may as such be determined in consideration of positioning accuracy variances of the positioning system. The positioning accuracy variances may correspond to typical variances of the accuracy of the positioning system which may be reflected by a predetermined threshold, for example. Non-identical absolute and relative positions may thus still be determined to match if the determined positioning deviation does not exceed the predetermined threshold. In one variant, determining a match or mismatch between the absolute position and the relative position may include comparing the determined positioning deviation with a deviation derived from an error distribution sample representing an absolute position and an error distribution sample representing a relative position. As an example, the distance between the determined absolute position and the determined relative position (i.e., the "actual" distance) may be compared to a distance between two random samples from two error distributions (one representing an absolute position and the other representing a relative position) and, if the actual distance is larger by a predetermined threshold compared to the distance of the random samples (e.g., if the actual distance is larger than three times the distance of the random samples), then the actual distance may be considered to be significant and the absolute position may be determined to be invalid (or "false"). Generally, it will be understood that assessing the positioning quality for an absolute position may not necessarily be limited to classifying absolute positions as valid or invalid (resulting in "binary" values of the assessed positioning quality). Rather, it is generally conceivable that the resulting assessed positioning quality values reflect values on a real value quality scale, such as on a 0-100% scale, for example.

To keep track of areas within which the localization area may be considered to have sufficient positioning quality and of areas within which the localization area may be considered to have insufficient positioning quality, a positioning coverage map that indicates positioning qualities within the localization area may be maintained. The method performed by the computing unit 100 may thus further comprise updating a positioning coverage map area to reflect the assessed positioning quality for the absolute position, wherein the positioning coverage map indicates positioning qualities within the localization area. The positioning coverage map may be updated continuously based on positioning quality assessments performed for absolute positions of the tag device within the localization area (such as the assessment described above). For example, a positioning quality assessment may be performed each time a new absolute position is determined for a tag device and the positioning coverage map may be updated based on the resulting positioning quality assessment accordingly.

In order to determine which areas may be considered to have insufficient positioning quality (so called "grey areas", representing areas where low-quality positioning may be available only), the method performed by the computing unit 100 may further comprise determining areas of low (or "inaccurate") positioning quality from the positioning coverage map. Areas of low positioning quality may correspond to areas within which at least part of the determined absolute positions are determined to be invalid or within which at least part of the positioning qualities of the observed absolute positions are determined to be below a predetermined threshold, for example. The determination of areas of low positioning quality may be carried out by an (e.g., event-driven) anomaly detection algorithm that repeatedly checks the positioning coverage map to detect changes in the positioning coverage. In one variant, the check may be performed each time a new absolute position is classified as invalid, for example. Determining areas of low positioning quality may as such be triggered upon classifying the absolute position as invalid.

In one particular variant, determining areas of low positioning quality from the positioning coverage map may include determining, from the positioning coverage map, at least one border separating areas of low positioning quality from areas of high positioning quality. Areas of high (or "accurate"/"sufficient") positioning quality (so called "white areas", representing areas where high-precision position may be available) may correspond to areas within which absolute positions are determined to be valid or within which positioning qualities of the observed absolute positions are determined to be above a predetermined threshold, e.g., on a real value quality scale, for example. The areas of low positioning quality may generally be determined using a machine learning model. For example, a machine learning model (e.g., a neural network or a support vector machine (SVM)) or another pattern recognition technique may be used to determine a border separating areas of low positioning quality from areas of high positioning quality.

The positioning coverage map and the analysis results derived therefrom, e.g., information on the determined areas of low positioning quality or information about the at least one border separating areas of low positioning quality from areas of high positioning quality) may generally be employed to improve positioning activities in or around critical areas in which low-precision positioning quality is given. For example, based on the knowledge of a rough border of a positioning coverage hole, tag devices may be configured to more precisely scan the area near the border in order to further refine the positioning coverage map in this area. To this end, the method performed by the computing unit 100 may further comprise changing an operation mode for performing absolute position measurements by tag devices at the at least one border. For example, changing the operation mode may include at least one of repeatedly performing absolute position measurements by the tag devices at the at least one border, increasing a frequency of performing absolute position measurements by the tag devices at the at least one border, changing a calculation method of performing absolute position measurements by the tag devices at the at least one border, and tuning radio properties of at least one of the tag devices at the at least one border and the plurality of anchor nodes. As such, tag device operation modes may be dynamically configured to repeatedly scan the border area and gradually increase the frequency of the absolute position measurements, i.e., tag devices getting close to the border may perform more absolute measurements to increase the number of data points, for example.

In addition, or in the alternative, to such positioning refinements, the positioning coverage map and the analysis results derived therefrom may also be employed to trigger preventive actions enabling tag devices moving through areas of low positioning quality to avoid negative effects resulting from the low-precision positioning. In one such variant, when the tag device is in an area of low positioning quality, the method performed by the computing unit 100 may further comprise informing the tag device that the tag device is in an area of low positioning quality, thereby enabling the tag device to take action accordingly. In another variant, when the tag device is in an area of low positioning quality, the method performed by the computing unit 100 may comprise instructing the tag device to raise an alarm indicating that positioning quality is low, thereby enabling a user operating a device associated with the tag device (or generally enabling a device associated with the tag device) to take preventive measures accordingly. Upon receiving such instructions, the tag device may raise an alarm to notify a human, or an AGV, that the positions are not accurately reported to a factory system, for example.

In a further variant, the method performed by the computing unit 100 may also comprise providing navigation information to at least one tag device within the localization area assisting the at least one tag device to avoid moving through the areas of low positioning quality. Input may as such be given to external industry processes, for example, to avoid areas in which positioning may not be sufficient for the actual use and intelligent route planning (e.g., for an AGV) avoiding these areas may be employed. In a still further variant, the information derived from the positioning coverage map may be used to enable infrastructure updates to extend accurate positioning areas and eliminate positioning coverage holes. The method performed by the computing unit 100 may thus further comprise generating information for positioning coverage extension to eliminate areas of low positioning quality within the localization area. The information for positioning coverage extension may include information on placement of additional anchor nodes, for example.

Figure 3:
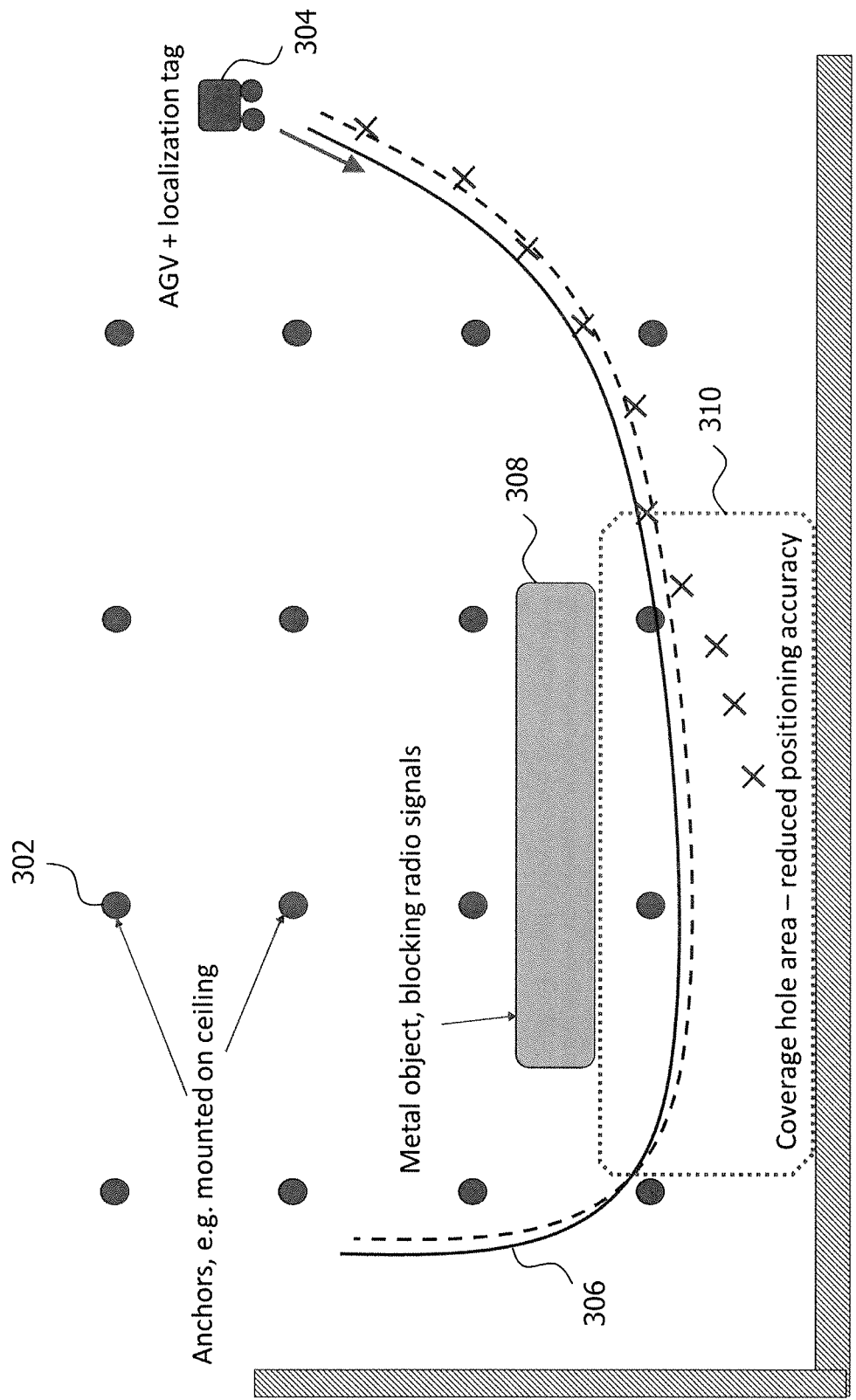
FIG. 3 illustrates an exemplary industrial environment in which the technique presented herein may be employed.

FIG. 3 illustrates an exemplary industrial environment in which the technique presented herein may be employed. As may be seen in the figure, the industrial environment may be equipped with a plurality of anchor nodes 302 (e.g., mounted on the ceiling) configured to determine positions of tag devices within the localization area of the industrial environment using radio technology. As an exemplary tag device, an AGV 304 with an attached localization tag is shown which moves along a movement path 306. As indicated by the crosses ("x") in the figure (representing absolute positions of the AGV 304 determined using the anchor node infrastructure), on the initial portion of the movement path, the determined absolute positions using the anchor node infrastructure substantially coincide with the continuously determined relative positions of the AGV 304 (indicated by the dashed line in the figure). As soon as the AGV 304 moves behind the metal object 308 in the industrial environment, however, where only a few anchor nodes 302 are available and the radio signals of other anchor nodes 302 located in front of the metal object 308 may be blocked, the determined absolute positions of the AGV 304 may start to significantly deviate from the determined relative positions, as indicated in the figure. The area behind the metal object 308 may consequently be determined as an area 310 of low positioning quality and may be reflected in a corresponding positioning coverage map, so that preventive measures avoiding negative effects of the low-precision positioning in the area 310 may be taken, as described above.

Figure 4:
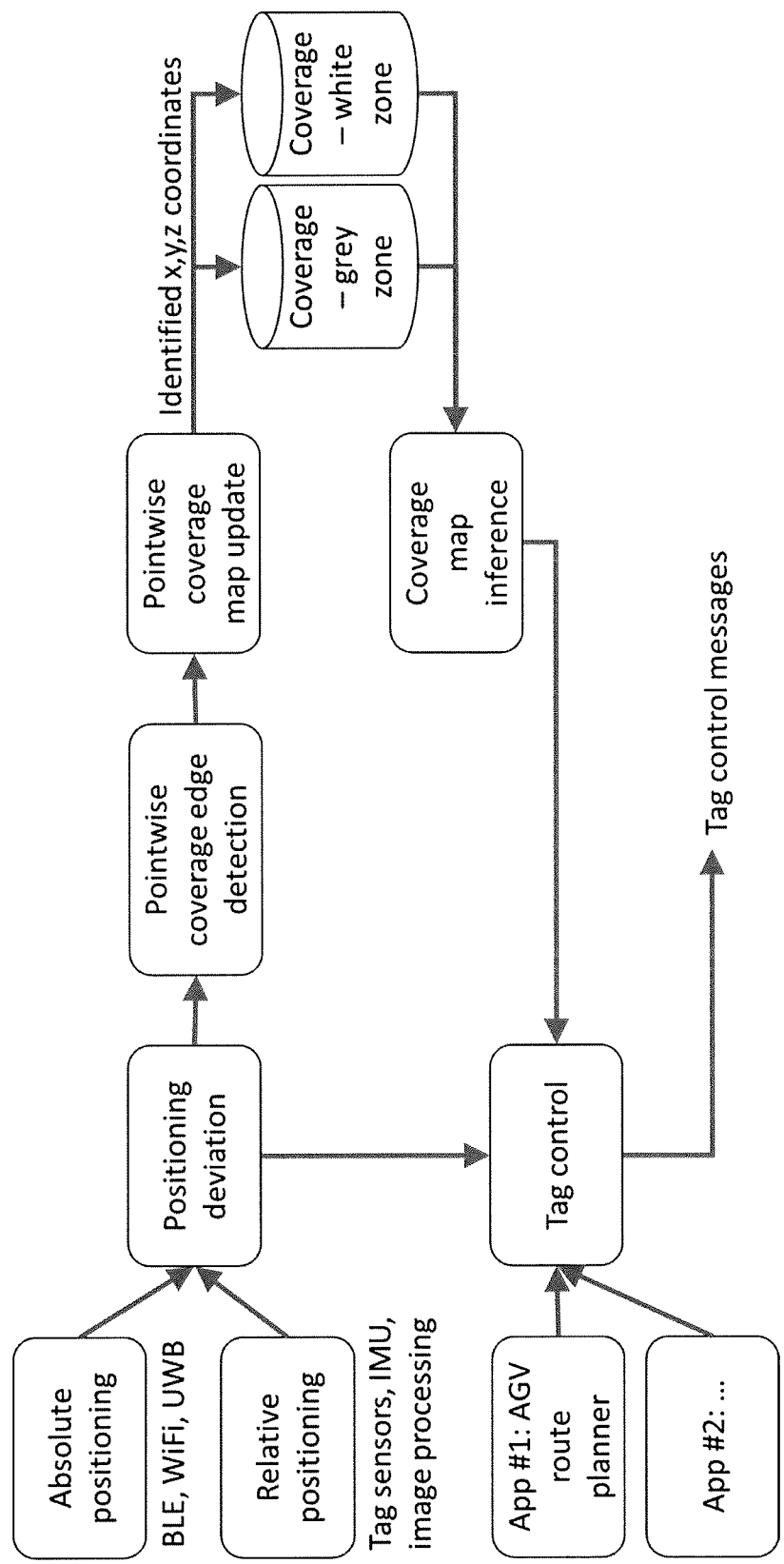
FIG. 4 illustrates an exemplary method implementation of the technique presented herein.

FIG. 4 illustrates an exemplary method implementation of the technique presented herein. As indicated in the figure, results of absolute positioning procedures (e.g., using Bluetooth Low Energy (BLE), WiFi, UWB, etc.) and relative positioning procedures (e.g., using tag sensors, IMU, image processing, etc.) may be compared to determine corresponding positioning deviations, based on which a positioning coverage map may be updated. More specifically, based on the positioning coverage map, a pointwise coverage edge detection may be performed (e.g., using pattern recognition techniques) to detect borders between grey areas and white areas in the map, a pointwise coverage map update may be performed, and the pointwise identified coordinates which represent the coverage areas of the grey zones and white zones may be stored. Based on the pointwise data, a positioning coverage map may then be inferred using machine learning based classification algorithms, such as using a discriminative SVM, for example, and, based on the inferred coverage map, tag devices may then be controlled according to one of the variants described above, e.g., by controlling an AGV using a route planner that directs the AGV around an area of low positioning quality or by reconfiguring the system with the aim to increase coverage map accuracy (e.g., changing the ranging frequency or other radio configurations, changing the anchor list to use, etc.), as described above.

As has become apparent from the above, the present disclosure provides a technique for assessing positioning qualities within a localization area of a positioning system, in particular for use in challenging industrial environments. Positioning qualities may be assessed by calculating the deviation between absolute and relative positions (e.g., combining sub-decimeter positioning with relative path tracking of the same tag) and, based thereon, positioning coverage maps may be calculated that can be used to prevent negative effects that may potentially arise in areas of low positioning quality (e.g., caused by location dependent changes in line-of-sight properties of radio signals used for positioning).

Intelligence (e.g., pattern recognition, anomaly detection, spatial clustering, etc.) may be employed to enable real-time detection of dynamic coverage zones and enable the flexible setting of the boundary accuracy between white zones and grey zones of the coverage map. The information on areas with low-precision positioning may be used to apply dynamic system/tag reconfigurations and to improve the anchor node infrastructure to enable high-precision positioning in previous grey areas, for example. Previous imperfect positioning capabilities, in particular in the boundary areas, may be improved by adjusting the tag operation mode, changing measurement configurations and/or changing calculation methods applied to the measured data on the fly, for example, and autonomous vehicles may be controlled to avoid low positioning quality areas.

The presented technique may generally provide an easy-to-use automatic method for positioning coverage optimization. The technique may be implemented as an inherent part of the positioning system and may as such not interfere with the positioning system's basic operation (e.g., continuous asset tracking). The system may work in a continuous operation mode to ensure always up-to-date coverage maps while adapting to the frequent changes of the environment. The iterative characteristic of the technique may enable providing a desired location dependent granularity, wherein the accuracy of the inferred zone boundary may be set at the necessary level according to the requirements of the use case. The presented technique may also offer a cost efficient solution for positioning optimization in challenging environments, in particular as compared to traditional fingerprinting methods that require manual measurements involving lots of workhours, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for assessing positioning qualities within a localization area of a positioning system comprising a plurality of anchor nodes for determining positions of tag devices within the localization area using radio technology, the method comprising:
   determining a positioning deviation between an absolute position of a tag device and a relative position of the tag device, the absolute position of the tag device being determined by the positioning system using the plurality of anchor nodes and the relative position of the tag device being determined based on movement-related measurements performed by the tag device relative to a previously determined absolute position of the tag device; and
   assessing a positioning quality for the absolute position based on the determined positioning deviation;
   wherein the absolute position of the tag device is determined by the positioning system, using radio technology, independently from any previously determined position of the tag device;
   wherein the tag device comprises at least one movement-related sensor configured to perform the movement-related measurements, wherein the at least one movement-related sensor comprises one or more of an accelerometer, a pedometer, an Inertial Measurement Unit (IMU), a gyroscope, a 6 Degree of Freedom (6DOF), a 9DOF sensor, a pressure sensor for measuring altitude changes, or a visual sensor; and
   wherein the relative position of the tag device is determined relative to the previously determined absolute position of the tag device by integrating steps of movement of the tag device from the previously determined absolute position of the tag device, wherein the steps of movement of the tag device are reported by the at least one movement-related sensor.

2. The method of claim 1, wherein assessing the positioning quality for the absolute position includes classifying the absolute position as valid or invalid depending on whether the absolute position is determined to match or mismatch the relative position, respectively.

3. The method of claim 2, wherein a match or mismatch between the absolute position and the relative position is determined in consideration of positioning accuracy variances of the positioning system.

4. The method of claim 2, wherein determining a match or mismatch between the absolute position and the relative position includes comparing the determined positioning deviation with a deviation derived from an error distribution sample representing an absolute position and an error distribution sample representing a relative position.

5. The method of claim 1, further comprising updating a positioning coverage map area to reflect the assessed positioning quality for the absolute position, the positioning coverage map indicating positioning qualities within the localization area.

6. The method of claim 5, wherein the positioning coverage map is updated continuously based on positioning quality assessments performed for absolute positions of the tag device within the localization area.

7. The method of claim 5, further comprising determining areas of low positioning quality from the positioning coverage map.

8. The method of claim 7, wherein determining the areas of low positioning quality is triggered upon classifying the absolute position as invalid.

9. The method of claim 7, wherein the areas of low positioning quality are determined using a machine learning model.

10. The method of claim 7, wherein determining the areas of low positioning quality from the positioning coverage map includes determining, from the positioning coverage map, at least one border separating areas of low positioning quality from areas of high positioning quality.

11. The method of claim 10, further comprising changing an operation mode for performing absolute position measurements by tag devices at the at least one border.

12. The method of claim 11, wherein changing the operation mode includes at least one of:
repeatedly performing absolute position measurements by the tag devices at the at least one border,
increasing a frequency of performing absolute position measurements by the tag devices at the at least one border,
changing a calculation method of performing absolute position measurements by the tag devices at the at least one border, and
tuning radio properties of at least one of the tag devices at the at least one border and the plurality of anchor nodes.

13. The method of claim 7, wherein, when the tag device is in an area of low positioning quality, the method further comprises informing the tag device that the tag device is in an area of low positioning quality.

14. The method of claim 7, wherein, when the tag device is in an area of low positioning quality, the method further comprises instructing the tag device to raise an alarm indicating that positioning quality is low.

15. The method of claim 7, further comprising:
providing navigation information to at least one tag device within the localization area assisting the at least one tag device to avoid moving through the areas of low positioning quality.

16. The method of claim 7, further comprising:
generating information for positioning coverage extension to eliminate areas of low positioning quality within the localization area.

17. The method of claim 16, wherein the information for positioning coverage extension includes information on placement of additional anchor nodes.

18. A non-transitory computer-readable storage medium on which is stored program code portions that, when executed on one or more computing devices, cause the one or more computing devices to assess positioning qualities within a localization area of a positioning system comprising a plurality of anchor nodes for determining positions of tag devices within the localization area using radio technology, the program code portions causing the one or more computing devices to:
determine a positioning deviation between an absolute position of a tag device and a relative position of the tag device, the absolute position of the tag device being determined by the positioning system using the plurality of anchor nodes and the relative position of the tag device being determined based on movement-related measurements performed by the tag device relative to a previously determined absolute position of the tag device; and
assess a positioning quality for the absolute position based on the determined positioning deviation;
wherein the absolute position of the tag device is determined by the positioning system, using radio technology, independently from any previously determined position of the tag device;
wherein the tag device comprises at least one movement-related sensor configured to perform the movement-related measurements, wherein the at least one movement-related sensor comprises one or more of an accelerometer, a pedometer, an Inertial Measurement Unit (IMU), a gyroscope, a 6 Degree of Freedom (6DOF), a 9DOF sensor, a pressure sensor for measuring altitude changes, or a visual sensor; and
wherein the relative position of the tag device is determined relative to the previously determined absolute position of the tag device by integrating steps of movement of the tag device from the previously determined absolute position of the tag device, wherein the steps of movement of the tag device are reported by the at least one movement-related sensor.

19. A computing unit for assessing positioning qualities within a localization area of a positioning system comprising a plurality of anchor nodes for determining positions of tag devices within the localization area using radio technology, the computing unit comprising at least one processor and at least one memory, the at least one memory containing instructions executable by the at least one processor such that the computing unit is configured to:
determine a positioning deviation between an absolute position of a tag device and a relative position of the tag device, the absolute position of the tag device being determined by the positioning system using the plurality of anchor nodes and the relative position of the tag device being determined based on movement-related measurements performed by the tag device relative to a previously determined absolute position of the tag device; and
assess a positioning quality for the absolute position based on the determined positioning deviation;

wherein the absolute position of the tag device is determined by the positioning system, using radio technology, independently from any previously determined position of the tag device;

wherein the tag device comprises at least one movement-related sensor configured to perform the movement-related measurements, wherein the at least one movement-related sensor comprises one or more of an accelerometer, a pedometer, an Inertial Measurement Unit (IMU), a gyroscope, a 6 Degree of Freedom (6DOF), a 9DOF sensor, a pressure sensor for measuring altitude changes, or a visual sensor; and wherein the relative position of the tag device is determined relative to the previously determined absolute position of the tag device by integrating steps of movement of the tag device from the previously determined absolute position of the tag device, wherein the steps of movement of the tag device are reported by the at least one movement-related sensor.

20. The computing unit of claim 19, wherein the computing unit is configured to assess the positioning quality for the absolute position by classifying the absolute position as valid or invalid depending on whether the absolute position is determined to match or mismatch the relative position, respectively.

* * * * *